Figure 1:
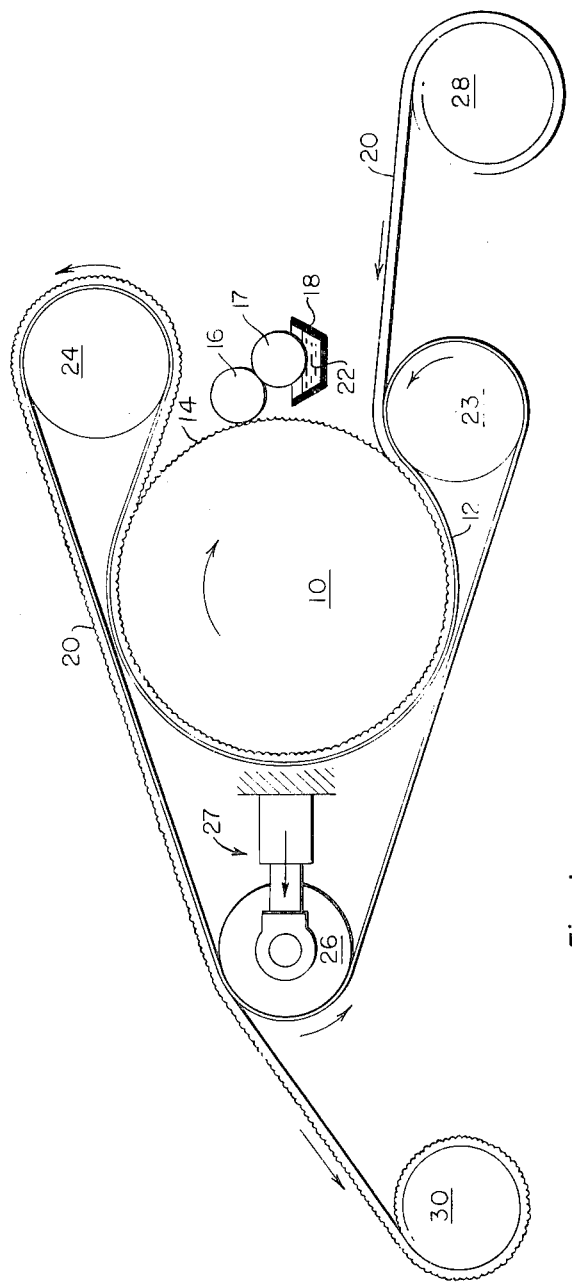

INVENTOR.
JAMES N. MASON

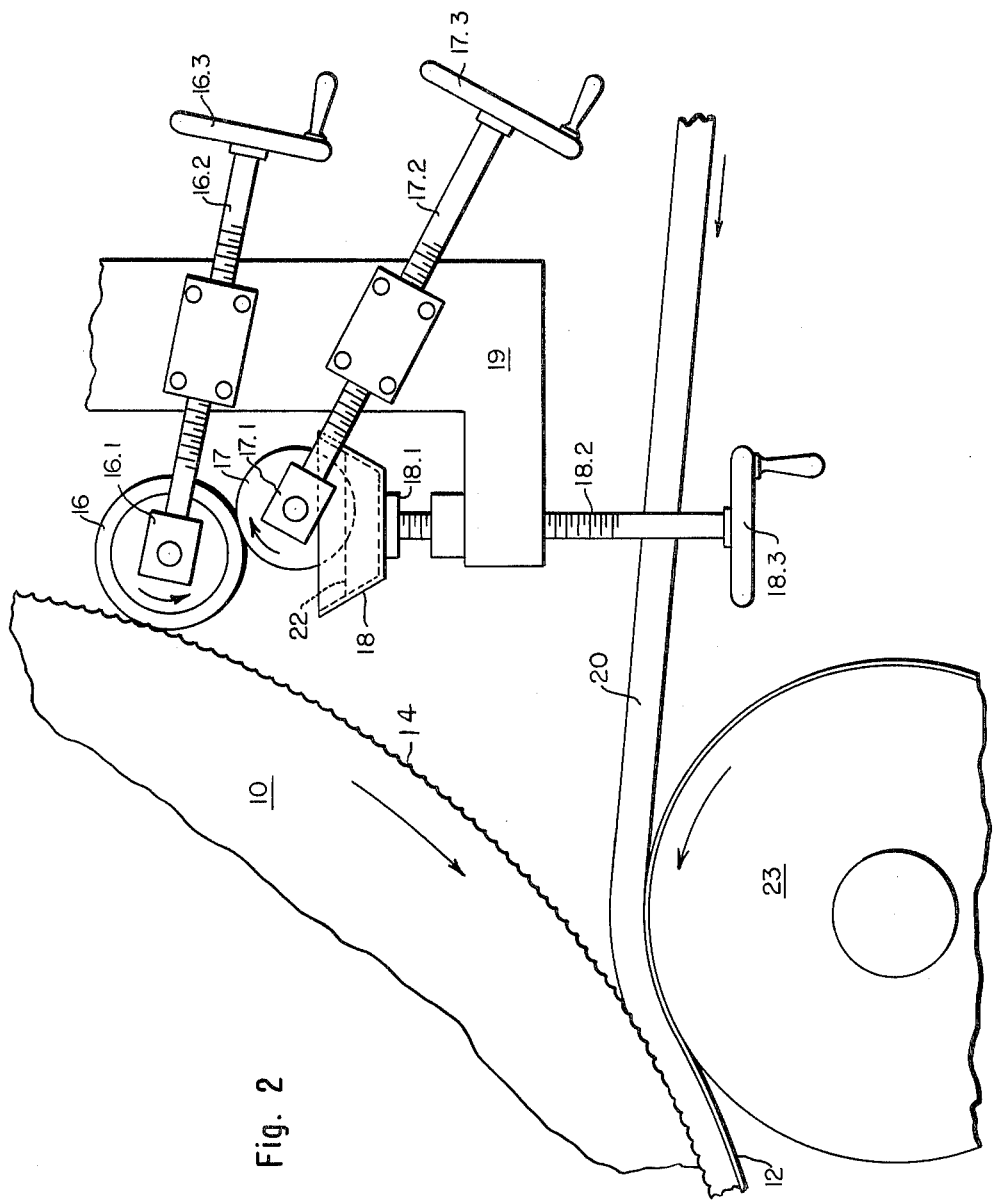

3,236,712
PROCESS OF PRODUCING MOLDED AND PRINTED SURFACE PATTERN IN PLASTIC STOCK
James N. Mason, Winchester, Mass., assignor to American Biltrite Rubber Co., Inc., Chelsea, Mass., a corporation of Delaware
Filed Mar. 28, 1962, Ser. No. 184,002
2 Claims. (Cl. 156—231)

This invention consists of a novel process of producing cured surface-molded sheet materials having selected printed areas. The process is applicable generally to any moldable and curable plastic sheet material, such as rubber, vinyl plastics, linoleum, etc., but is described herein with particular reference to the manufacture of vulcanizable rubber flooring.

The present application is filed as a continuation-in-part of my prior application Serial No. 613,001 filed October 1, 1956.

Decorative sheet materials for use as flooring and the like are commonly made from a plastic stock. A colored design effect may be applied to the sheet by printing or otherwise applying the desired colors and design to the surface, or by forming the sheet from batches of different colored stock combined in a manner producing the desired design, as, for instance in the manufacture of "inlaid" linoleum.

Where a molded or profiled surface effect is desired, that is generally formed by pressing the surface of the sheet against a mold having a contour the reverse of that desired in the sheet product. In the manufacture of rubber sheet, the stock is vulcanized, generally by heating it while in contact with a heated surface which may be embossed if desired.

In the prior art processes coloring and embossing have been carried out as separate operations performed in separate equipment. The present invention provides a continuous process of forming elastomeric sheet materials having decorative molded surfaces in which the color design is applied simultaneously with the molding and curing operations, and is preferably applied only in the indented regions of the profiled pattern. By so localizing the printed areas within the indented regions of the pattern, these areas are largely protected against abrasion and wear and are thus outstandingly long lasting.

In general the process of this invention consists in applying a special vulcanizable or curable ink to selected areas of the hot mold and then applying that mold to the plastic sheet under pressure so as to mold the surface of the sheet, cure or vulcanize the ink film and transfer the cured film to the molded sheet. The invention is preferably carried out by means of a mold in the form of a rotating drum against the surface of which the plastic sheet stock is continuously pressed by a smooth band. Ink is applied to the drum by fountain rollers engaging the drum in advance of its point of contact with the sheet, whereby the drum is inked only at the higher portions of it profiled surface. These regions correspond to the depressions in the molded plastic surface and the ink is therefore applied only in the valleys of the final product. Being in the depressions in the surface, the printed areas are subject to little or no wear and they accordingly provide a decoration of long service life.

The invention is particularly applicable to the manufacture of decorative rubber flooring in which case it is carried out with a heated vulcanizing drum having a profiled molding surface of the desired configuration. Sheeted uncured stock of natural or synthetic rubber is fed against the drum under pressure so that the inked and heated surface of the drum simultaneously molds and prints the surface of the rubber sheet in the same operation in which the stock is vulcanized.

One mode of successful operation of my novel process depends upon the employment of a liquid rubber-based ink that is capable of being vulcanized or cured upon the hot profiled surface of the drum and so transformed into a solid flexible film. This solid film of ink is bonded by vulcanization to the sheet stock and therefore is transferred cleanly from the drum surface as an integral part of the cured stock.

The presently preferred embodiment of the invention as applied to the manufacture of rubber flooring is described in detail below with reference to the accompanying drawings in which:

FIG. 1 is a schematic side elevation of suitable apparatus for carrying out the invention, and FIG. 2 is a fragmentary cross-sectional view showing the details of the printing features of the apparatus shown in FIG. 1.

The preferred manner of practicing the invention utilizes a continuous rotary vulcanizer such as the type described in United States Reissue Patent No. Re 20,037 and in United States Patent No. 2,114,517. Since such apparatus is well-known in the art, only those parts particularly operable in practicing the present invention are shown and described in detail in this specification.

The apparatus consists essentially of a rotatably driven heated drum 10 around a portion of which is wrapped a steel tension band 12. The stock 20 to be processed is fed between the drum 10 and band 12, with the band pressing the stock tightly against the drum. As shown in FIG. 1 the band 12 travels around a portion of the drum 10 between a pressure roll 23 and a driving roll 24 and is doubled back around the rolls 23 and 24 and supported under tension by a tension roller 26. The tension roller 26 is mounted (as by hydraulic means 27 described in United States Patent No. 2,039,271) to be horizontally movable to exert outward pressure maintaining the band 12 under tension. The sheet stock 20 is fed from a supply roll 28 to and between the band 12 and drum 10 at the nip of the pressure roll 23, travels with the band 12 around the drum under vulcanizing temperature and is then carried by the band to be the tension roller 26. The stock 20 is then stripped from the band 12 and coiled conveniently as a roll of product 30.

In the practice of this invention the drum 10 is formed with a profiled face 14 which travels in contact with a soft elastic inking roller 16. The inking roller rotates in contact with transfer roller 17 which in turn runs in a trough 18 carrying a supply of ink 22. The two rollers 16 and 17 and the trough 18 are carried by adjustable mounting means by which the inking pressure of each of the rolls and the depth of travel of the transfer roll in the trough may be adjusted. As shown, the rolls 16 and 17 are carried in bearings 16.1 and 17.1 respectively, which are in turn carried by threaded rods 16.2 and 17.2 respectively provided with a handwheel 16.3 and 17.3 respectively. The trough is similarly mounted on a bearing 18.1 which is carried by a threaded rod 18.2 having a handwheel 18.3. The entire assembly of rollers 16 and 17 and trough 18 is carried by a base member 19 in which each of the threaded rods 16.2, 17.2 and 18.2 is engaged.

The ink used in the production of rubber flooring must be rubber-based and capable of vulcanization by contact with the hot drum surface into a vulcanized film. In the production of a vinyl flooring the ink should be vinyl-based and capable of adhesion on contact with the drum surface.

In carrying out this process, rubber stock of any well-known formulation suitable for flooring is first formed into an uncured sheet 20 which is feed between the rotating drum 10 and band 12. In rotating, the drum 10 passes in contact with the inking roller 16 in advance of its coming in contact with the sheet 20, and is there inked at this higher portions of its embossed surface 14. The extent to which the mold surface 14 is inked is controlled by the position and pressure of the inking roller 16, which may be in tight contact with the surface 14 to ink the elevated areas to a greater depth or in a light contact to ink them only at their highest regions, depending on the extent of inking desired in the valleys of the final sheet product. The amount of liquid ink applied to the surface 14 may similarly be controlled by adjusting the pressure under which the transfer roller 17 bears on the inking roller 16.

As the sheet 20 of the rubber stock contacts and travels with the drum 10, the printed and profiled surface design is permanently engrained and impressed in the finally vulcanized rubber sheet and the ink which has now been converted to a solid flexible film is united to the sheet stock. By this process attractively decorated sheet materials may be manufactured readily, and the product is one which is long lasting and durable.

Although described with reference to a preferred embodiment it is contemplated that other means of applying ink in selected regions of the drum may be used, and the location of the inked areas may also be varied to produce various decorative effects. A plurality of colors, with appropriate means of applying them in selected areas may similarly be used in the practice of this invention.

Having thus disclosed this invention and described in detail the preferred manner of carrying it out, I claim and desire to secure by Letters Patent:

1. A continuous process of producing cured plastic sheet stock having a molded and printed surface pattern, characterized by the steps of direcely applying a liquid coating of the same uncured plastic-based ink to a heated drum having a relief molding contour which in profile is the reverse of the desired pattern, then pressing uncured elastomeric sheet stock against the inked relief molding contour of the drum, holding the sheet under conditions of heat and pressure until in one continuing operation, (1) the liquid ink is cured and transformed into a solid flexible film on the hot profiled surface of the drum,
   (2) the surface of the stock is molded to the contour of the hot drum,
   (3) the stock is cured throughout, and
   (4) the solid film of ink is transferred cleanly from the hot elevated areas of the drum surface to the corresponding depressed areas of the molded cured stock and permanently bonded thereto.

2. The continuous process defined in claim 1, further characterized in that the plastic sheet stock is an unvulcanized rubber compound and that the ink is rubber-based, unvulcanized and capable of being vulcanized as a film on the hot profile drum surface and of being transferred therefrom and bonded in the vulcanization step to the sheet of rubber compound.

References Cited by the Examiner

UNITED STATES PATENTS

| | | | |
|---|---|---|---|
| 2,310,642 | 2/1943 | Marcy | 18—6 |
| 2,646,379 | 7/1953 | Poschel | 156—240 XR |
| 2,681,612 | 6/1954 | Reimann | 101—25 |

EARL M. BERGERT, *Primary Examiner.*

MORRIS LIEBMAN, *Examiner.*